United States Patent
Kowalski (10) Patent No.: US 8,473,595 B2
(45) Date of Patent: Jun. 25, 2013

(54) METHOD AND SYSTEM TO AUTOMATICALLY ADAPT WEB SERVICES FROM ONE PROTOCOL/IDIOM TO ANOTHER PROTOCOL/IDIOM

(75) Inventor: Vincent Joseph Kowalski, Houston, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 12/650,107

(22) Filed: Dec. 30, 2009

(65) Prior Publication Data

US 2011/0161477 A1  Jun. 30, 2011

(51) Int. Cl.
*G06F 15/173* (2006.01)

(52) U.S. Cl.
USPC ............ 709/223; 709/201; 709/217; 709/219

(58) Field of Classification Search
USPC ................ 709/219, 223, 224, 225, 226, 220, 709/221, 222
See application file for complete search history.

(56) References Cited

U.S. PATENT DOCUMENTS

| | | | |
|---|---|---|---|
| 7,685,304 B2 * | 3/2010 | Kothari et al. | 709/230 |
| 2004/0143665 A1 | 7/2004 | Mace et al. | |
| 2008/0140861 A1 * | 6/2008 | Kothari et al. | 709/246 |
| 2009/0070410 A1 * | 3/2009 | Gilfix et al. | 709/203 |
| 2009/0077477 A1 * | 3/2009 | Khan et al. | 715/760 |
| 2009/0187410 A1 * | 7/2009 | Wilpon et al. | 704/270.1 |
| 2009/0240728 A1 * | 9/2009 | Shukla et al. | 707/103 R |
| 2009/0327868 A1 * | 12/2009 | Tsukikawa | 715/239 |
| 2010/0095266 A1 * | 4/2010 | Novak | 717/101 |
| 2010/0125590 A1 * | 5/2010 | Puranik et al. | 707/758 |
| 2011/0161465 A1 | 6/2011 | Kowalski | |
| 2011/0296499 A1 | 12/2011 | Knjazihhin et al. | |

OTHER PUBLICATIONS

Office Action received for U.S. Appl. No. 12/750,143, mailed on Nov. 15, 2012, 16 pages.

* cited by examiner

*Primary Examiner* — Dhairya A Patel (57) ABSTRACT

A method and system to convert an existing web service from a first web services implantation type to a second web services implementation type. Example implementation types include SOAP and Representational State Transfer (REST). This conversion is achieved by recognizing and classifying available information from each of the distinct implementation types. After proper recognition and classification as disclosed herein, a deterministic process may be utilized to assist in converting or translating the exposed interface; thereby assisting in developing an interface, based on a different interface type than the one already exposed, may be provided.

11 Claims, 9 Drawing Sheets

METHOD AND SYSTEM TO AUTOMATICALLY ADAPT WEB SERVICES FROM ONE PROTOCOL/IDIOM TO ANOTHER PROTOCOL/IDIOM

BACKGROUND

This disclosure relates generally to the field of web services. More particularly, but not by way of limitation, this disclosure refers to a method of adapting web services based on different implementations (SOAP or RESTful) to an implementation style other than that for which a web service was originally provided. For example, providing a system and method to convert an existing RESTful web service on an endpoint to expose a SOAP interface, or convert a SOAP interface to expose a RESTful web service.

In the web services world, Representational State Transfer (REST) is a design architecture that embraces a stateless client-server architecture in which the web services are viewed as resources and can be identified by their Universal Resource Locators (URLs). Web services clients that want to use these resources may access a particular representation by transferring application content using a small globally defined set of remote methods that describe the action to be performed on the resource.

SOAP used to be an acronym that stood for Simple Object Access Protocol. However over time the acronym was dropped and there is now no official meaning attributed to the name SOAP; it is an arbitrary name. SOAP is built on top of eXtensible Markup Language (XML). SOAP is a protocol in which operations (similar to functions or subroutines in standard programming languages) are invoked. This invocation typically causes an implementation on a server (e.g., SOAP web services endpoint) to execute some code and return a result. SOAP can be viewed as a "request-response" type of model.

Today web services are not standardized such that they may interact with requests of a plurality of protocols or design architectures. It is also clear that both SOAP and REST based web services are going to coexist in the world for the foreseeable future. Given this existing lack of standardization, there is a need for a method and system to provide translation/conversion of an existing web service such that the same web service may be more easily exposed for web applications desiring interaction in a different manner. For example, SOAP represents one type of web service prevalent today and RESTful represents a different type of web service. Therefore, software developers faced with not only technical but financial considerations may benefit from the embodiments disclosed herein.

Figure 1:
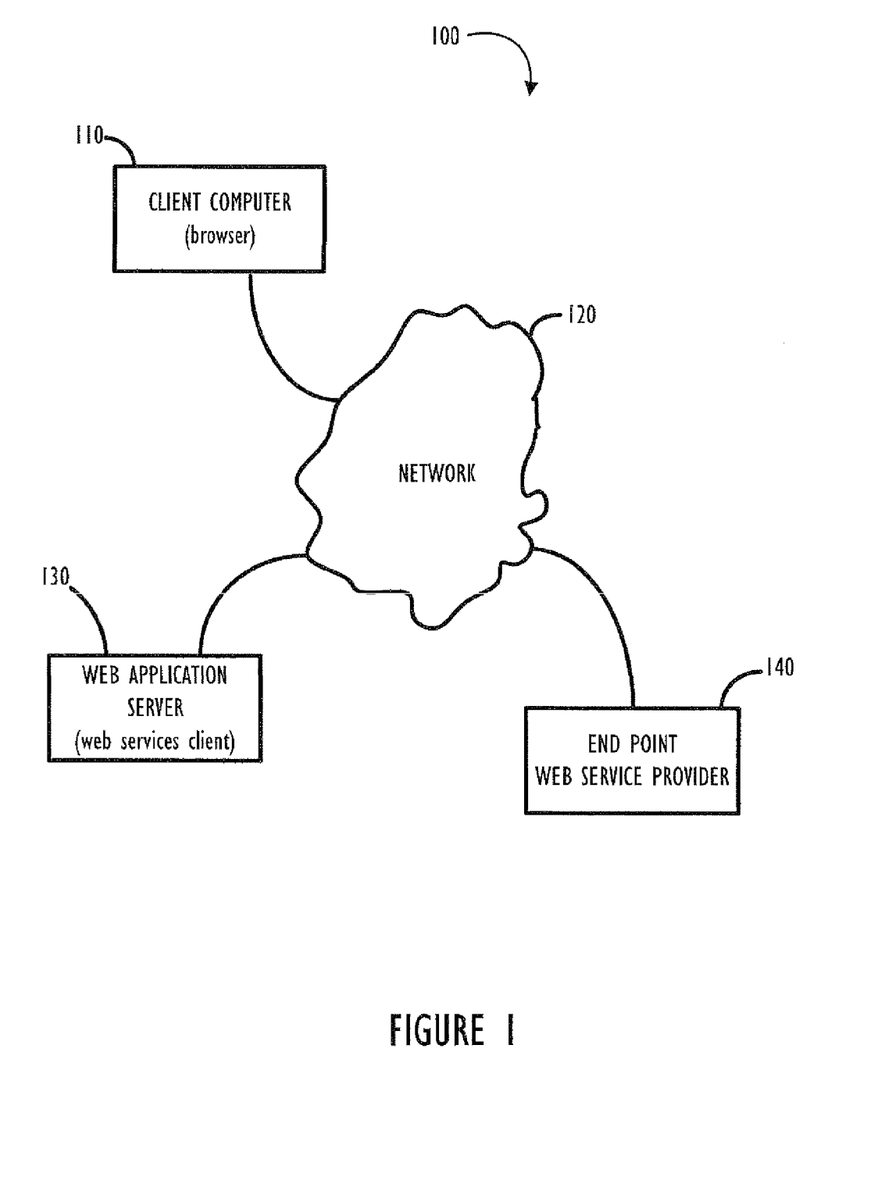
FIG. 1 shows, in block diagram form, an exemplary client communicatively coupled to a web application server and a web service provided by an endpoint.

Referring now to FIG. 1, a high level block diagram of an interconnected computer system 100 is shown. Client computer 110 represents a computer which executes a web browser and may connect (via a Universal Resource Locator (URL)) to web application server 130. In this example, web application server 130 is a consumer of web services provided by a web services provider (endpoint) 140. Communication between client computer 110, web application server 130, and endpoint 140 take place across network 120. A request across network 120 for a web service will typically be an encapsulated "message." The message may allow for sending/receiving one or more pieces of information. This encapsulation may be accomplished in many ways, including a SOAP style request or a RESTful style request, among others. In other words, typical requests across a network are bundles of information such that multiple interactions (for a discrete piece of information) between a web application executing on web application server 130 and endpoint 140 may be minimized.

Network 120 represents a communication coupling between computers (e.g., 110, 130 and 140). Network 120 may be either wired or wireless. Examples of network 120 include, but are not limited to, a LAN, WAN, Internet, Intranet and the like. Note the segregation of functions described is logical and not physical. Therefore, it is possible for any combination of a client application, a web application, and a web services provider (endpoint) to coexist on the same physical computer without actually sending data across a network such as network 120. Further, the designation of client versus server may exist between any levels of this logical segregation. Therefore, client refers to a requesting application/computer and server refers to an application/computer servicing the request.

SUMMARY

Disclosed are methods and systems to allow a web application requesting information based on a particular type of web services interface (e.g., SOAP or RESTful) to have that request adapted/converted into another type of web services interface. For example, a web application desiring to communicate with an existing SOAP web service via a RESTful interface could have its request converted automatically from RESTful to SOAP and delivered to the existing SOAP interface. This adaptation or conversion may also be applied to an existing SOAP web services interface on a web server exposing a RESTful interface. The inverse may also be supplied (e.g., conversion from RESTful interface to a SOAP interface). Thus, existing web services may be more easily extended to provide a plurality of interface types without having to redesign and expose an interface for each type desired by client web applications. Also, responses from the exiting web service may be converted back to the paradigm expected by the web application client before being returned.

DETAILED DESCRIPTION

Methods and systems to convert from one web services implementation type to another web services implementation type are disclosed. In order for a client computer and a server computer to properly work together there must be a consistent interface between the two computers. That is not to say that both computers must use the same interface. Rather, if a client computer is configured to send/receive a particular interface type (e.g., SOAP/REST) and a server computer is configured to answer requests from a different interface type then some adaptation or conversion must be performed before this client can properly communicate with the server. Disclosed is a method and system to convert an existing web service provided by an endpoint to a different interface type. After the conversion the endpoint may provide a plurality of interfaces for clients (e.g., web applications) configured to send/receive in either the original interface or the newly supplied and exposed interface of a different type. The embodiments disclosed herein are confined to SOAP and RESTful web services. However, those of ordinary skill in the art, given the benefits of this disclosure, will recognize that the concepts disclosed may also be applicable to other web services interface implementation types.

To aid in the understanding of this disclosure the following definitions are provided:

WSDL: Web Services Definition Language (WSDL) is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate. WSDL is typically used to define and describe the interfaces of SOAP-based web services.

WADL: Web Application Description Language (WADL) is described in a specification promulgated by the World Wide Web Consortium (W3C). WADL is designed to provide a machine process-able description of such HTTP-based Web applications. An increasing number of Web-based enterprises (e.g., Google, Yahoo, Amazon, Flickr) are developing HTTP-based applications that provide programmatic access to their internal data. Google is a registered trademark of Google Inc., Mountainview Calif. Yahoo and Flickr are registered trademarks of Yahoo! Inc., Sunnyvale Calif. Amazon is a registered trademark of Amazon.com, Inc., Seattle Wash. Typically these applications are described using textual documentation that is sometimes supplemented with more formal specifications such as XML schema for XML-based data formats. WADL may be used to define and describe the interfaces of RESTful web services.

XML: eXtensible Markup Language is a set of rules for encoding documents electronically. It is defined in the XML 1.0 Specification produced by the W3C and several other related specifications; all are fee-free open standards. XML's design goals emphasize simplicity, generality, and usability over the Internet. It is a textual data format, with strong support via Unicode for the languages of the world. Although XML's design focuses on documents, it is widely used for the representation of arbitrary data structures, for example in web services. Each of the standards for WSDL, SOAP and WADL described herein are expressed in XML.

XSLT: eXtensible Stylesheet Language (XSL) Transformations is a declarative, XML-based language used for the transformation of XML documents into other XML documents. The original document is not changed; rather, a new document is created based on the content of an existing one. The new document may be serialized (output) by the processor in standard XML syntax or in another format, such as HTML or plain text. XSLT is often used to convert XML data into HTML or XHTML documents for display as a web page: the transformation may happen dynamically either on the client or on the server, or it may be done as part of the publishing process. XSLT is also used to translate XML messages between different XML schemas, or to make changes to documents within the scope of a single schema, for example by removing the parts of a message that are not needed.

Web Application: a web application (webapp) is an application that is typically accessed via a web browser over a network such as the Internet or an intranet. The term may also refer to a computer software application that is hosted in a browser-controlled environment (e.g., a Java applet) or coded in a browser-supported language (such as JavaScript) and reliant on a common web browser to render the application executable. Web Applications are usually segregated into logical layers called "tiers," where every tier is assigned a role. For the examples of this disclosure, it is assumed a webapp is divided into a client side tier (presentation) communicating directly with a web browser and a server side tier, providing the functionality (business logic) of the application, communicating with web services. However, one of ordinary skill in the art will recognize that a webapp may be implemented with an N-tier architecture.

Figure 2A:
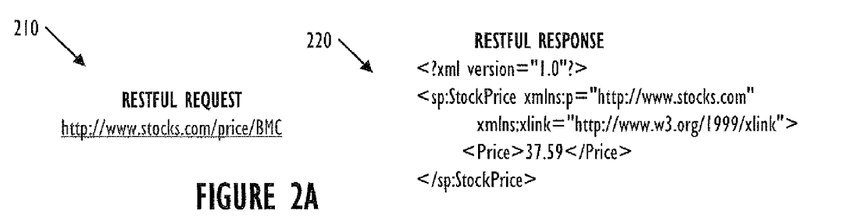
FIGS. 2A-B show an example web services request/response for a RESTful web service and SOAP-based web service.
Figure 2B:
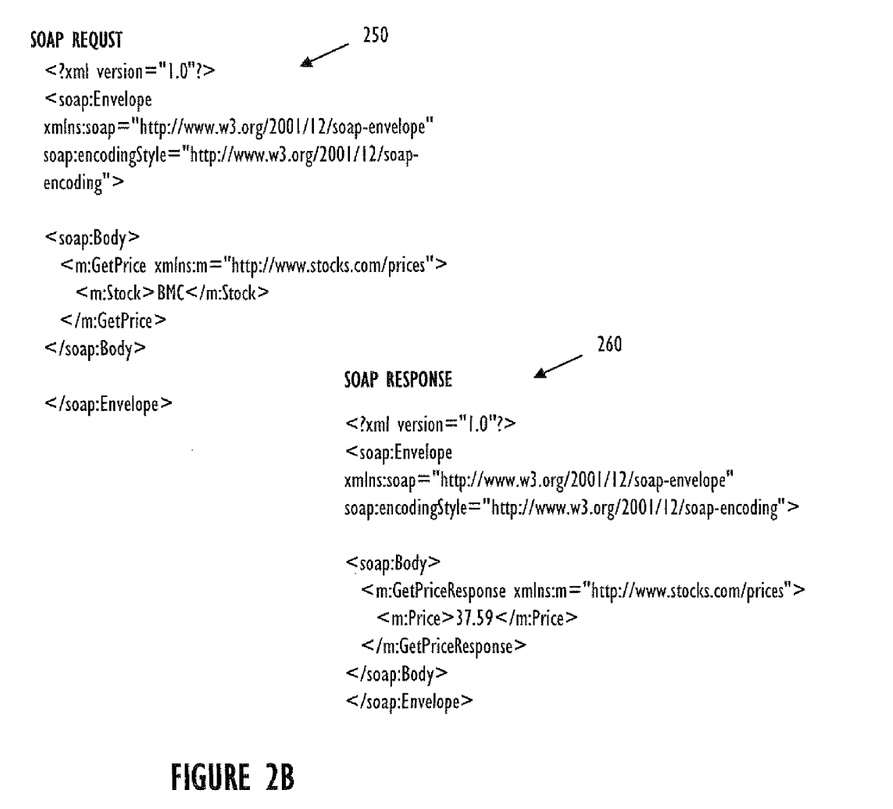

Referring now to FIGS. 2A-B, an example web service request/response for each of REST and SOAP are shown. This web service operation would get the stock price for a particular stock symbol. As those of ordinary skill in the art will recognize, REST is actually the architecture underlying the Web. Therefore, when comparing REST with SOAP (which is really a protocol, not an architecture) we classify the RESTful web services based on different idioms described below. RESTful web services are invocations of functionality across the Web that complies with the REST architecture. In contrast, SOAP invocations are done by communicating the function semantics and syntax (i.e., the operation and parameter names) with an endpoint. To make a REST request a user navigates to a resource. This navigation is usually accomplished by an HTTP operation, typically (although not exclusively) a GET. This is a key distinction between REST and SOAP.

Returning now to FIG. 2A, a RESTful request is simply a URL as shown in element 210. The corresponding RESTful response in XML is shown in element 220. FIG. 2A shows the corresponding SOAP-based response and request. Element 250 shows the request in an XML based SOAP envelope and element 260 shows an example response that may be provided by a SOAP-based web service. Note, the syntax used here is for illustration purposes only. As such, the URLs used in the examples may or may not be actual working URLs.

Explained next are sample embodiments of a conversion process. First, an example conversion of a SOAP interface to a RESTful interface is described. Second, an example of classifying a RESTful web service and converting the classified RESTful web service to a SOAP interface is described.

Figure 3:
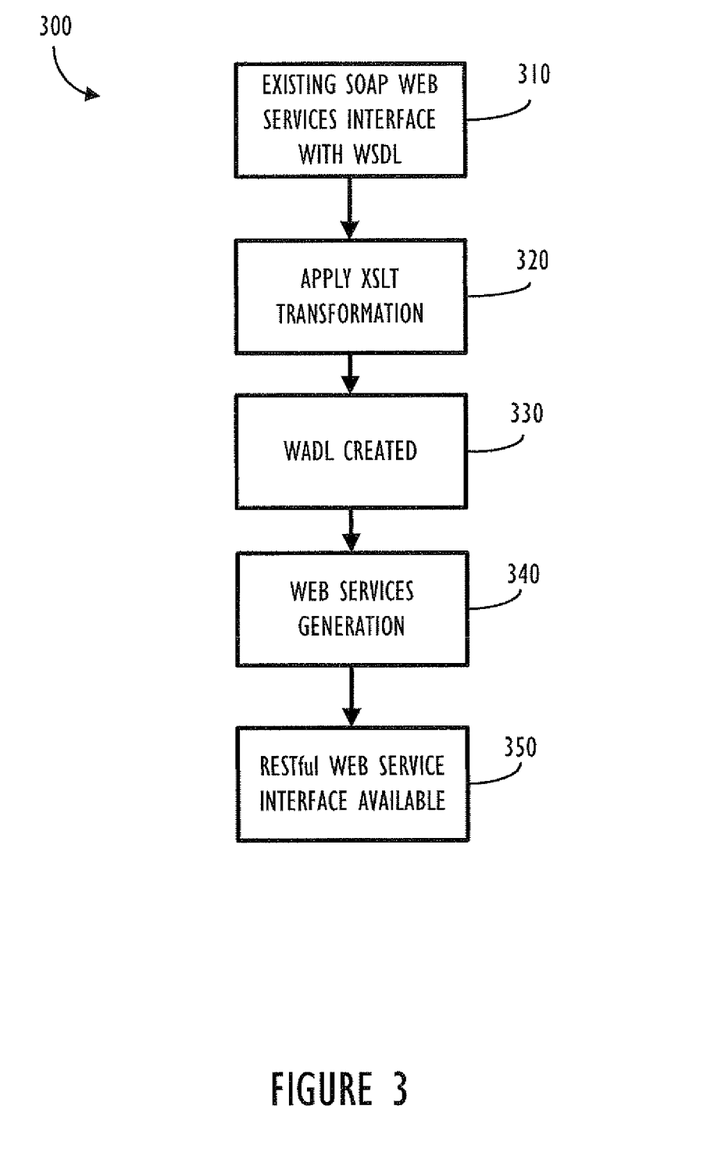
FIG. 3 shows, in flowchart form, an embodiment of converting a SOAP web service into a RESTful web service.

Referring now to FIG. 3, conversion process 300 is shown. Process 300 begins at block 310, which depicts an existing SOAP interface and its corresponding WSDL description. WSDL is implemented in XML. Therefore, an XSLT transformation may be applied (block 320) to produce a WADL description of the interface (block 330). Utilizing the created WADL a new RESTful web services interface may be generated (block 340). Finally, the new RESTful web service interface may be made available (exposed) on a web server at block 350.

Figure 4:
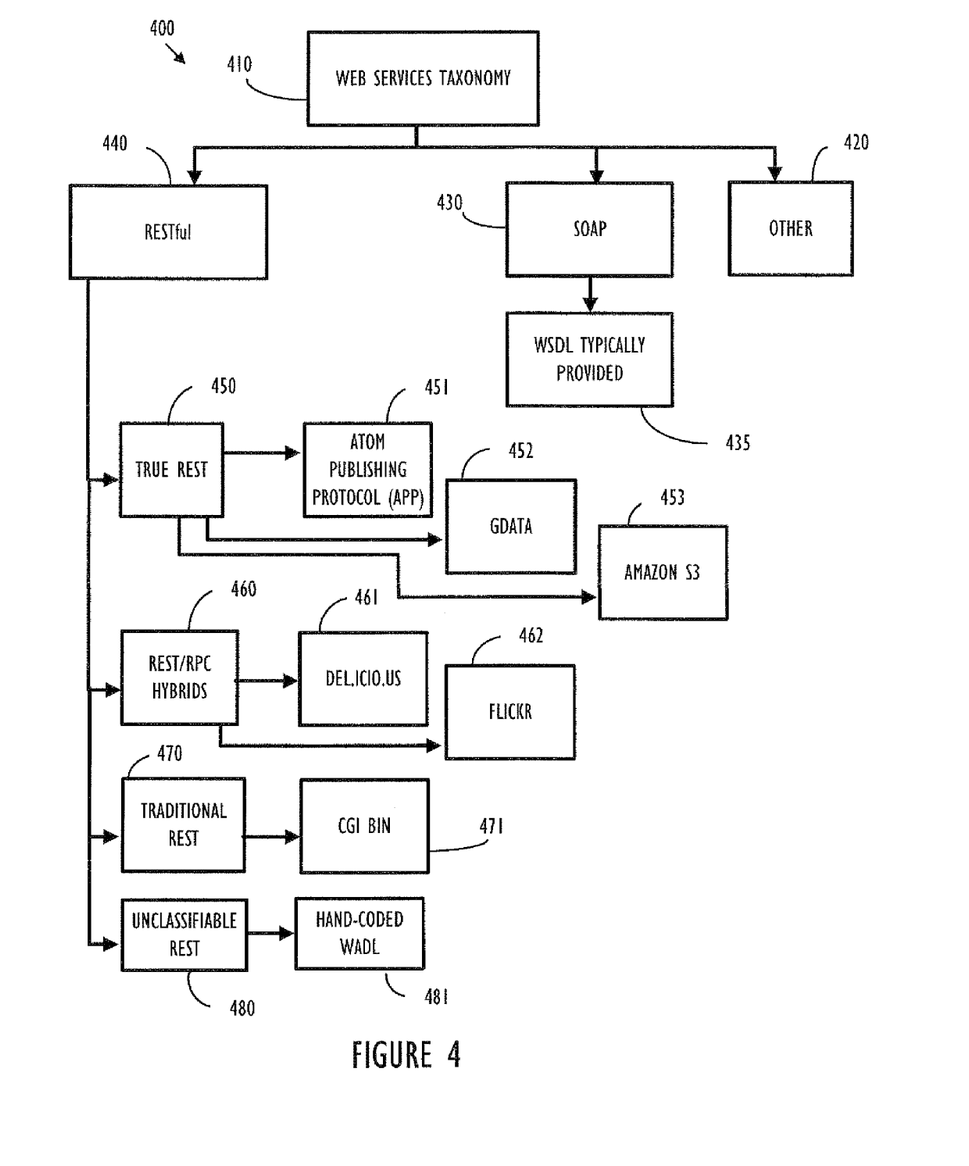
FIG. 4 shows an exemplary taxonomy useful for classification of a RESTful web service.

Referring now to FIG. 4, taxonomy diagram 400 is shown. Block 410 represents the universe of web services types (e.g., RESTful-based 440, SOAP-based 430 or some other type of implementation type 420). As described above, a SOAP-based web service will typically be described using WSDL as shown at block 435. A RESTful web service may be parsed to recognize what type (i.e., classification idiom) of RESTful web service it is. When parsing the RESTful web service, key elements of the service request may be determined. These can be derived from the well-defined syntax of the HTTP request. The HTTP request typically has at least the elements of operation, host, user-agent, content-type, content-length and authorization. Using the values associated with these elements a classification of the RESTful web service may be accomplished. Different classifications for RESTful web services, include but are not limited to, True REST 450, REST/RPC Hybrids 460, Traditional REST 470 and Unclassifiable REST 480.

True REST 450 is an idiom in which all verb information is addressed by the HTTP operation being used. In other words, four basic CRUD (Create, Read, Update, Delete) operations POST, GET, PUT and DELETE are used. Because of the general nature of the payload that can be handled by an HTTP POST, it can also be used for operations other than CRUD. In True REST 450 any parametric information to these operations are typically part of the URI and the main "object" being accessed by the HTTP operation is also part of the URI (usually at the end). For example, the True REST style of expressing obtaining a price quote for BMC's stock might look like:

GET www.mystocks.com/price_quote/BMC.

Examples of True REST web services include Atom Publishing Protocol (451), GDATA (452) and Amazon S3 (453).

REST/RPC Hybrid (460) is an idiom in which there is usually one fairly general purpose HTTP operation (most normally GET or POST) that is used. The actual operation then is part of the URI. Parameters to the operation can either be passed as part of the URI or in the HTTP body. Since it is more general purpose, the following examples are focused on use of the POST operation. Note, there are notable examples public services that primarily use GET such as the delicio.us Web Service (461) and the FLICKR web service 462. Additionally, some public services use a combination of operations. An example of REST/RPC parameters in the URI is:

POST www.mystocks.com/price_quote/BMC/get.

An example of parameters in the body is:

```
POST www.mystocks.com/price_quote/get
...
<stock>
    <stockName>BMC</stockName>
</stock>.
```

Traditional REST (470) is an idiom which includes invocations of CGI bin scripts (471). CGI bin scripts were early forerunners of modern web services. Such web services are inherently RESTful. A Traditional REST implementation of the stock quote operation could look like:

http://www.stocks.com/stocks/GetPrice?symbol=BMC.

Unclassifiable REST (480) represents an idiom in which, based on the information in the URI, it is not clear which information in the request represents the verb, what information in the request represents the parameter information, and what is the object being manipulated. In these cases, knowledge of the syntax and semantics of the Web Service must be known. Once determined a hand-coded WADL (481) may be created to allow support for future conversion of this Web Service.

Figure 5:
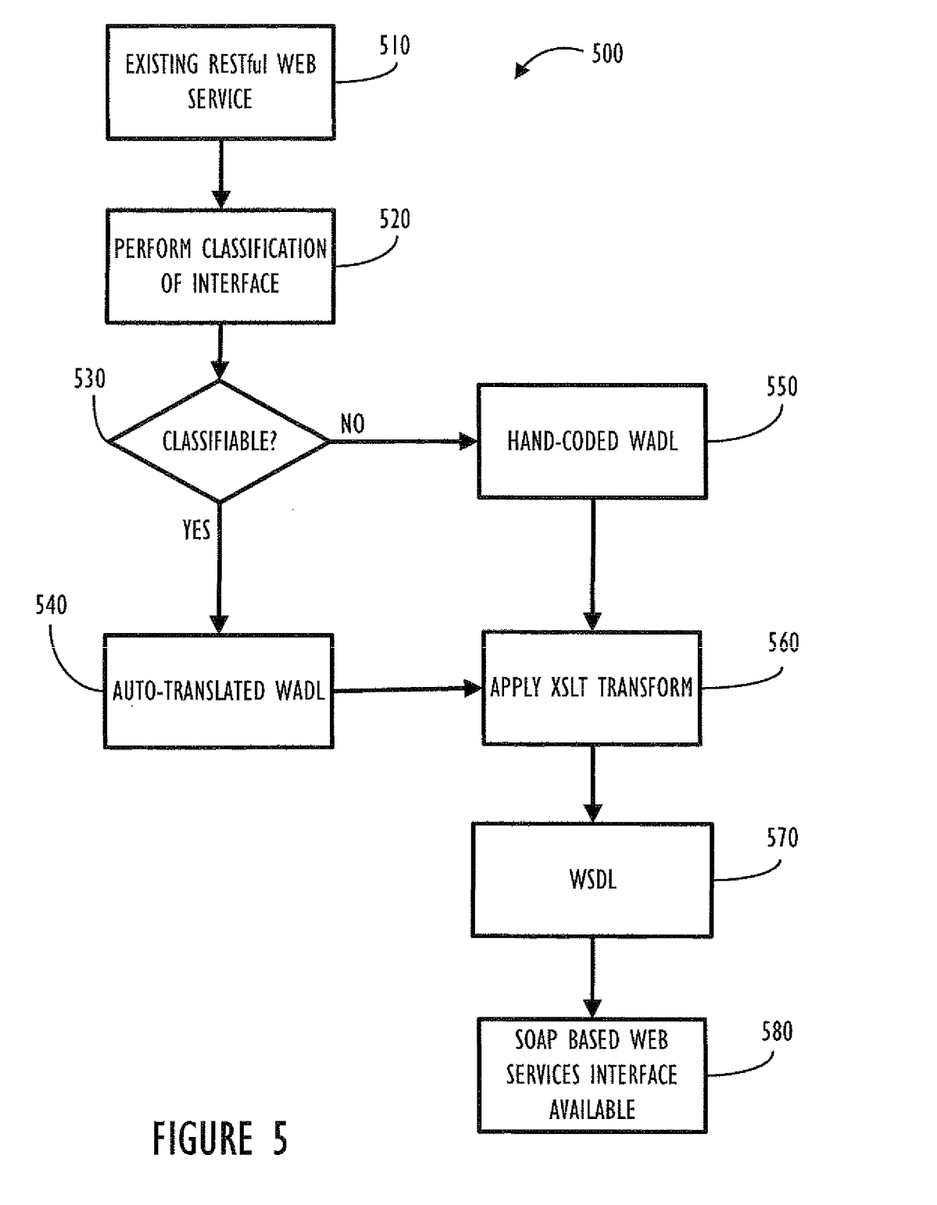
FIG. 5 shows, in flowchart form, an embodiment of converting a RESTful web service into a SOAP web service.

Referring now to FIG. 5, process 500 is shown. Process 500 begins at block 510 with an existing RESTful Web Service. Classification of the exposed interface is performed at block 520. If the exposed interface is unclassifiable, the NO prong of 530 a hand-coded WADL may need to be created as represented by block 550. If the classification is possible, the YES prong of 530 then an auto-translated WADL may be created at block 540. In either case the WADL is processed by applying an XSLT transformation (block 560) to produce a WSDL description at block 570. Finally, at block 580, a SOAP-based Web Service interface may be made available on the web server.

Figure 6:
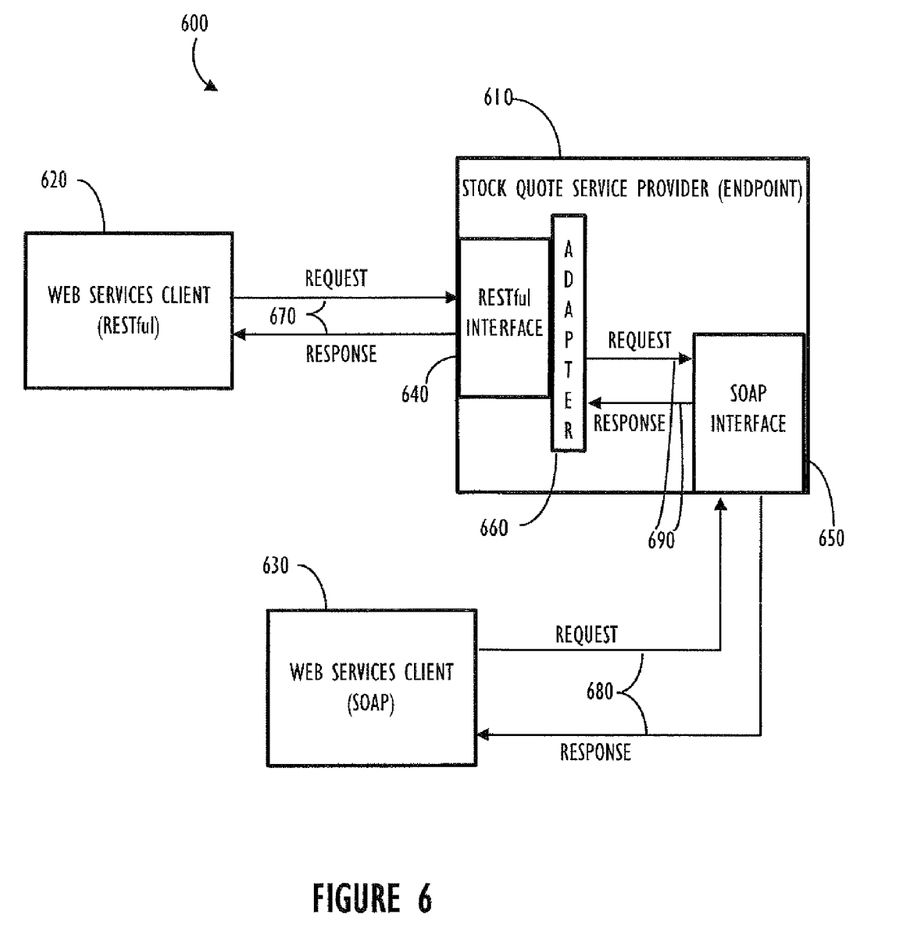
FIG. 6 shows, in block diagram form, a possible adapter architecture for performing conversions of web services requests from one interface type to another.

Referring now to FIG. 6, sample architecture 600 of implementing an adapter on a web services endpoint 610 is shown. In this example, Stock Quote Service Provider (Endpoint) 610 originally provided a SOAP interface and has been enhanced to provide a different interface type (e.g., RESTful) based on the concepts of this disclosure. Web services client 620 represents a client requiring a RESTful interface to endpoint 610. Web services client 630 represents a client requiring a SOAP interface to endpoint 610. Endpoint 610 is configured such that SOAP-based requests are serviced directly via SOAP interface 650. However, RESTful interface 640 requires adapter 660 to handle web services requests. RESTful request/response messages are represented by flow control arrows 670. SOAP request/response messages are represented by flow control arrows 680. Note, RESTful requests flow from client 620 to RESTful interface 640. Next, these requests are converted by adapter 660 to a SOAP request. Internal to the endpoint 610, SOAP-based requests flow (as represented by flow control arrows 690) between adapter 660 and original SOAP interface 650. Also note, adapter 660 performs conversion of both the request and the response in this example. Additionally, one of ordinary skill in the art will recognize, given the benefit of this disclosure, the functionality performed by blocks 640 and 660 may not necessarily be performed on endpoint 610. Each function represented by RESTful interface 640 and adapter 660 may be performed, in whole or in part, on a different computer system (e.g., web services client 620).

Figure 7:
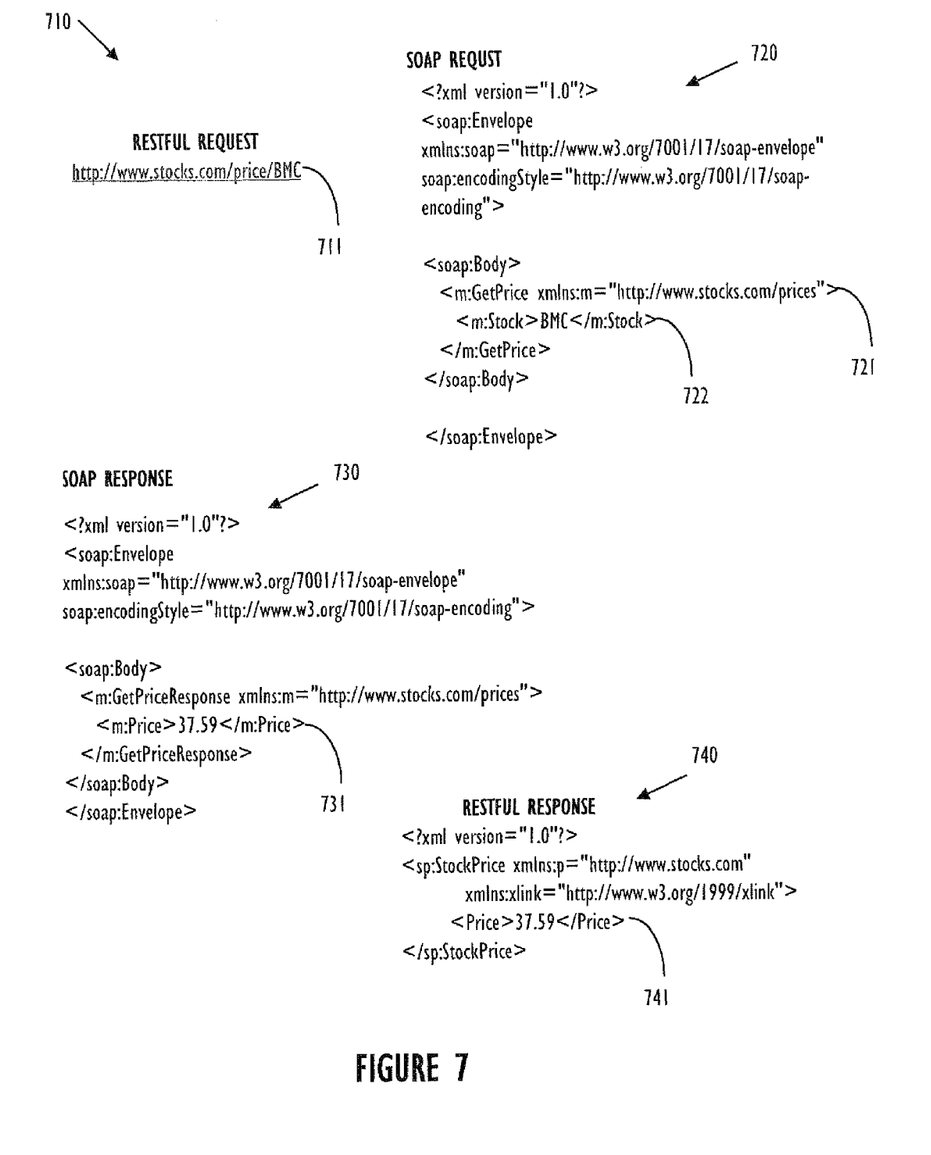
FIG. 7 shows an example mapping of a RESTful access request/response into a SOAP-based request/response.

Referring now to FIG. 7, mappings of corresponding parameters and operations from different interface request types are shown. Elements 710 and 720 show requests to the exemplary stock quote endpoint (shown in FIG. 6). Note that "price" and "BMC" from line 711 map to "GetPrice" on line 721 and "BMC" on line 722. Elements 730 and 740 show corresponding responses. Note that "Price" on line 731 maps to "Price" on line 741. These mappings are exemplary of conversions processes that could be performed when a client requests a RESTful web service and the web server is implemented originally with SOAP.

Figure 8:
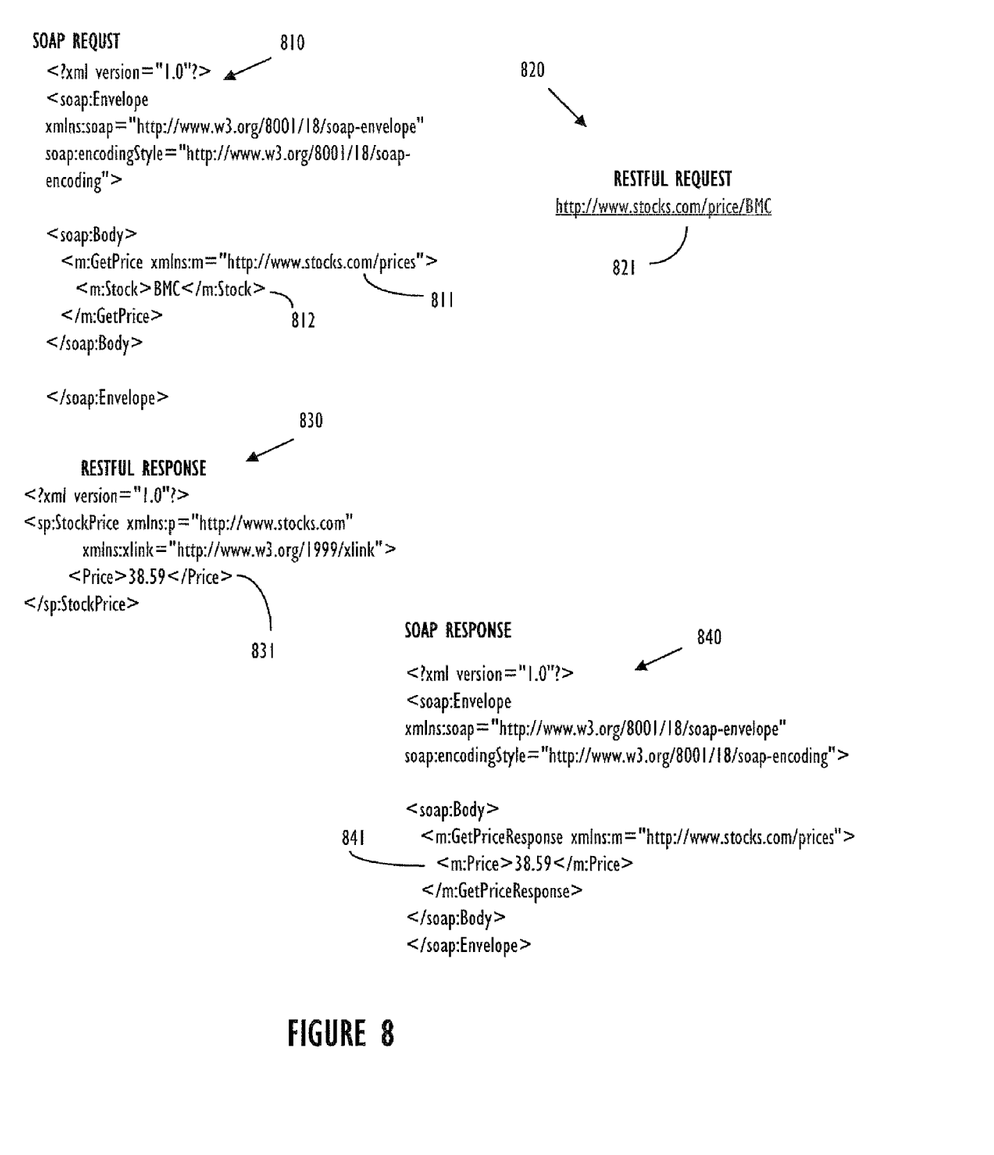
FIG. 8 shows an example mapping of a SOAP access request/response into a RESTful based request/response.

Referring now to FIG. 8, mappings of corresponding parameters and operations from different interface request types are shown (inverse of FIG. 7). Elements 810 and 820 show requests to an exemplary stock quote server originally implemented as a RESTful web service provider. Element 810 is an original SOAP request. The SOAP request may be mapped to a RESTful request by mapping "GetPrice" (line 811) and "BMC" (line 812) to URL line 821. Next, the RESTful response 830 and the finally converted SOAP response 840 are shown. Note, "Price" on line 831 may be mapped to "Price" on line 841.

Figure 9:
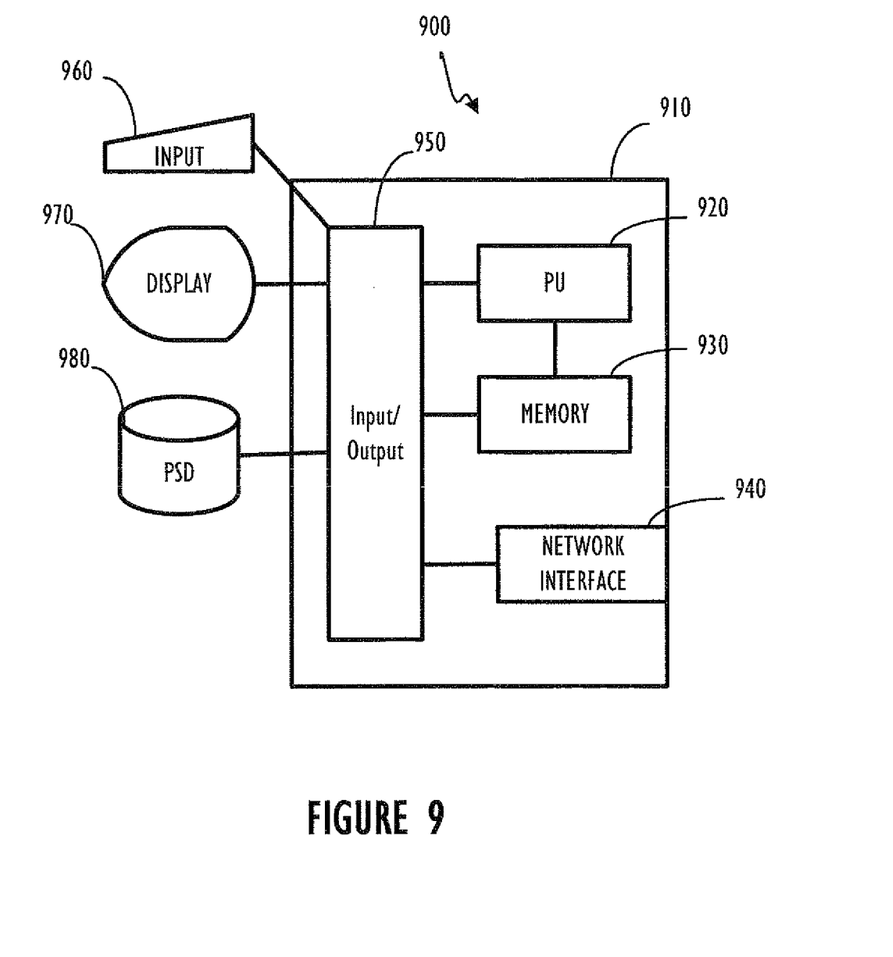
FIG. 9 shows, in block diagram form, an exemplary computing device comprised of a program control device.

Referring now to FIG. 9, an exemplary computing device 900 is shown. One or more exemplary computing devices 900 may be included in a mainframe computer (not shown). Exemplary computing device 900 comprises a programmable control device 910 which may be optionally connected to input 960 (e.g., keyboard, mouse, touch screen, etc.), display 970 or program storage device (PSD) 980 (sometimes referred to as a direct access storage device DASD). Also, included with program device 910 is a network interface 940 for communication via a network with other computing and corporate infrastructure devices (not shown). Note network interface 940 may be included within programmable control device 910 or be external to programmable control device 910. In either case, programmable control device 910 will be communicatively coupled to network interface 940. Also note, program storage unit 980 represents any form of non-volatile storage including, but not limited to, all forms of optical and magnetic storage elements including solid-state storage.

Program control device 910 may be included in a computing device and be programmed to perform methods in accordance with this disclosure (e.g., those illustrated in FIGS. 5 and 3). Program control device 910 comprises a processor unit (PU) 920, input-output (I/O) interface 950 and memory 930. Processing unit 920 may include any programmable controller device including, for example, processors of an IBM mainframe (such as a quad-core z10 mainframe microprocessor). Alternatively, in non-mainframe systems examples of processing unit 920 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 930 may include one or more memory modules and comprise random access memory (RAM), read only memory (ROM), programmable read only memory (PROM), programmable read-write memory, and solid state memory. One of ordinary skill in the art will also recognize that PU 920 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 3 and 5 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 3 and 5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of providing a web services interface, the method comprising:
    obtaining information about an exposed Representational State Transfer (RESTful) web services interface on a first web server computer;
    parsing, with a processing device configured to parse web services interface information, the RESTful web services interface information to classify an idiom of the RESTful web services interface as one of plurality of RESTful web services idioms, wherein each RESTful web services idiom, if classification is possible, is classified as corresponding with a respective one of a true REST syntax, a REST/RPC hybrid syntax and a traditional REST syntax;
    if classification is possible, automatically generating a Web Application Description Language (WADL) description of the RESTful web services interface;
    if classification is not possible, creating a hand-coded WADL description of the RESTful web services interface;
    applying an eXtensible Stylesheet Language Transformation (XSLT) to the automatically-generated WADL description or the hand-coded WADL description to produce a Web Services Definition Language (WSDL) description of the RESTful web services interface; and
    exposing a Simple Object Access Protocol (SOAP)-based web services interface on a second web server computer using the WSDL description.

2. The method of claim 1, wherein the first web server computer and the second web server computer are the same computer.

3. The method of claim 1, wherein parsing the RESTful web services interface further comprises parsing to identify an operation and any associated parameters of a web services request.

4. A method of providing a web services interface, the method comprising:
   obtaining information about an exposed Representational State Transfer (RESTful) web services interface on a first web server computer;
   parsing interface information for the RESTful web services interface;
   determining whether the interface information for the RESTful web services interface is classifiable;
   if the interface information is classifiable:
      classifying, based on the parsed interface information, an idiom of the RESTful web services interface as one of a plurality of RESTful web services idioms; and
      automatically generating a Web Application Description Language (WADL) description of the RESTful web services interface;
   if the interface information is not classifiable, creating a hand-coded WADL description of the RESTful web services interface;
   applying an eXtensible Stylesheet Language Transformation (XSLT) to the automatically-generated WADL description or the hand-coded WADL description to produce a Web Services Definition Language (WSDL) description of the RESTful web services interface;
   exposing a Simple Object Access Protocol (SOAP)-based web services interface on a second web server computer using the WSDL description;
   obtaining information about an exposed SOAP web services interface on a third web server computer;
   applying, with a processing device configured to transform WSDL files, an XSLT transformation to a WSDL description of the exposed SOAP interface to produce a WADL description of the SOAP web services interface;
   generating a second RESTful web services interface using the WADL description; and
   exposing the second RESTful web services interface on a third web server computer.

5. The method of claim 4, wherein the second web server computer and the third web server computer are a same web server computer.

6. The method of claim 4, wherein parsing the SOAP web services interface further comprises parsing to identify an operation and any associated parameters of a web services request.

7. The method of claim 4, wherein classifying the idiom of the RESTful web services interface includes classifying the idiom as corresponding with a respective one of a true REST syntax, a REST/RPC hybrid syntax and a traditional syntax.

8. A non-transitory computer-readable medium comprising computer readable instructions stored thereon to cause a processing device to perform the method of providing a web services interface, the method comprising:
   obtaining information about an exposed Representational State Transfer (RESTful) web services interface on a first web server computer;
   parsing, with a processing device configured to parse web services interface information, the RESTful web services interface information to classify an idiom of the RESTful web services interface as one of plurality of RESTful web services idioms, wherein each RESTful web services idiom, if classification is possible, is classified as corresponding with a respective one of a true REST syntax, a REST/RPC hybrid syntax and a traditional REST syntax;
      if classification is possible, automatically generating a Web Application Description Language (WADL) description of the RESTful web services interface;
      if classification is not possible, creating a hand-coded WADL description of the RESTful web services interface;
   applying an eXtensible Stylesheet Language Transformation (XSLT) to the automatically-generated WADL description or the hand-coded WADL description to produce a Web Services Definition Language (WSDL) description of the RESTful web services interface; and
   exposing a Simple Object Access Protocol (SOAP)-based web services interface on a second web server computer using the WSDL description.

9. A non-transitory computer readable medium comprising computer readable instructions stored thereon to cause a processing device to perform the method of providing a web services interface, the method comprising:
   obtaining information about an exposed Representational State Transfer (RESTful) web services interface on a first web server computer;
   parsing interface information for the RESTful web services interface;
   determining whether the interface information for the RESTful web services interface is classifiable;
   if the interface information is classifiable:
      classifying, based on the parsed interface information, an idiom of the RESTful web services interface as one of a plurality of RESTful web services idioms; and
      automatically generating a Web Application Description Language (WADL) description of the RESTful web services interface;
   if the interface information is not classifiable, creating a hand-coded WADL description of the RESTful web services interface;
   applying an eXtensible Stylesheet Language Transformation (XSLT) to the automatically-generated WADL description or the hand-coded WADL description to produce a Web Services Definition Language (WSDL) description of the RESTful web services interface;
   exposing a Simple Object Access Protocol (SOAP)-based web services interface on a second web server computer using the WSDL description;
   obtaining information about an exposed SOAP web services interface on a third web server computer;
   applying, with a processing device configured to transform WSDL files, an XSLT transformation to a WSDL description of the exposed SOAP interface to produce a WADL description of the SOAP web services interface;
   generating a second RESTful web services interface using the WADL description; and
   exposing the second RESTful web services interface on a third web server computer.

10. An apparatus comprising:
   a processor, the processor being configured to:
   if classification of a Representational State Transfer (RESTful) web services interface is possible, classify an idiom of a RESTful web services interface for a first computer as one of a plurality of RESTful web services idioms, wherein each classifiable RESTful web services interface idiom is classified as corresponding with a respective one of a true REST syntax, a REST/RPC hybrid syntax and a traditional REST syntax;

if classification of the RESTful web services interface is not possible, create a hand-coded Web Application Description Language (WADL) description of the RESTful web services interface;

obtain information about a Simple Object Access Protocol (SOAP) web services interface for a second computer;

convert, via first eXtensible Stylesheet Language Transformation (XSLT), RESTful web services requests/responses of the classified idiom or the hand-coded WADL description received from the first computer to SOAP request/responses to be transmitted to the second computer; and convert, via a second XSLT, SOAP requests/responses received from the second computer to RESTful web services requests/responses to be transmitted to the first computer, the conversion of the SOAP requests/responses being based on the classified idiom or the hand-coded WADL description.

11. The apparatus of claim 10, wherein the first computer and the second computer are a same computer.

* * * * *

UNITED STATES PATENT AND TRADEMARK OFFICE
CERTIFICATE OF CORRECTION

PATENT NO. : 8,473,595 B2
APPLICATION NO. : 12/650107
DATED : June 25, 2013
INVENTOR(S) : Kowalski Page 1 of 1

It is certified that error appears in the above-identified patent and that said Letters Patent is hereby corrected as shown below:

On the Title page, in Item [57], under "Abstract", in column 2, line 2, delete "implantation" and insert -- implementation --, therefor.

In the Claims

In column 8, line 45, in claim 1, delete "one of plurality" and insert -- one of a plurality --, therefor.

In column 9, line 65, in claim 8, delete "one of plurality" and insert -- one of a plurality --, therefor.

In column 11, line 11, in claim 10, delete "request/responses" and insert -- requests/responses --, therefor.

Signed and Sealed this
Twenty-fourth Day of September, 2013

Teresa Stanek Rea
*Deputy Director of the United States Patent and Trademark Office*